Nov. 25, 1958

A. H. KERSEY ET AL 2,861,584

HYDRAULIC TRANSMISSION ARRANGEMENTS
FOR SELF-PROPELLED VEHICLES

Filed March 22, 1956

Inventors
A. H. Kersey
F. D. Cooper
By Glascock Downing Seebold
Attys.

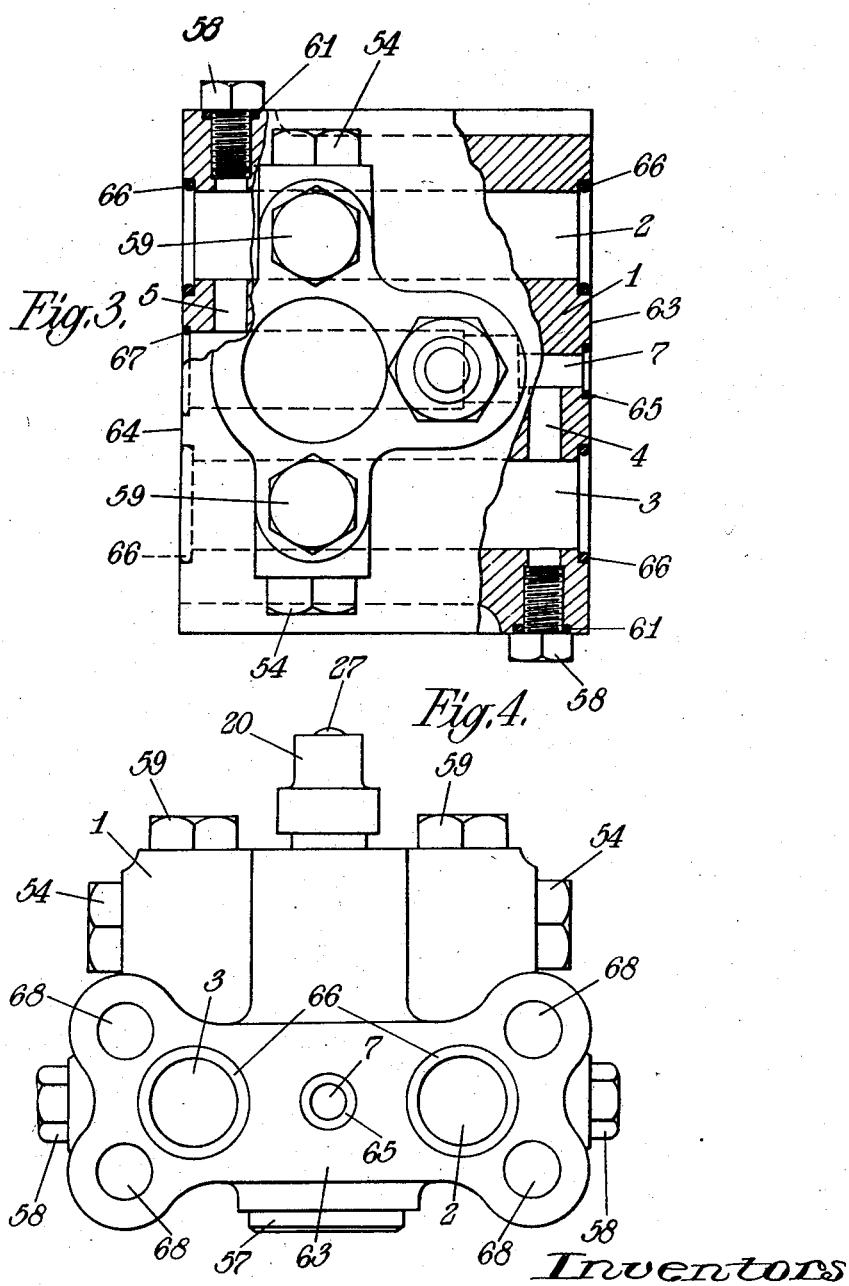

Inventors
A. H. Kersey
F. D. Cooper

United States Patent Office 2,861,584
Patented Nov. 25, 1958

2,861,584

HYDRAULIC TRANSMISSION ARRANGEMENTS FOR SELF-PROPELLED VEHICLES

Albert H. Kersey, Castle Bromwich, and Frederick D. Cooper, Coventry, England, assignors to Ford Motor Company Limited, London, England Application March 22, 1956, Serial No. 573,145

Claims priority, application Great Britain March 25, 1955

4 Claims. (Cl. 137—108)

This invention relates to hydraulic transmission arrangements for self-propelled vehicles of the kind in which a conventional power unit drives a pump supplying high-pressure liquid to one or more hydraulic propelling motors to achieve propulsion of the vehicle.

The invention consists of a hydraulic, transmission arrangement of the kind described in which a non-return valve, loaded by a spring compressed by operable means, is provided connected to the high-pressure liquid-feed line from the pump to the hydraulic motor or motors, to provide for predetermined release pressures affecting the propulsion of the motor or motors.

The operator may thus limit the pulling power of the vehicle to the maximum desirable draft force required by the type of machine being used. Thus the valve could be set to provide a low limit of draft force for light-draft machines or a high limit of draft force, up to the maximum obtainable, to suit heavy-draft machines; intermediate limits of draft force between the minimum and maximum desirable also being able to be predetermined and the valve set accordingly by the operator.

In addition it is intended that such overload, release means when operated can only be reset to obtain a pressurized condition of the hydraulic transmission means for vehicle-propulsion purposes at the will of the driver and thus, when once so operated to obtain release of load, no repetition of impact with the original restrictive object or any other cause for initial overload can take place.

As the orifice to this non-return valve should be small to reduce the size of the spring and also the forces contained within the operating mechanism, only a small quantity of liquid can be passed by the said valve when an overload pressure is obtained but in a preferred construction this small quantity of liquid is directed to the operating face of a piston within a separate chamber immediately to cause to open firstly a supplementary and considerably larger valve to allow a greater quantity of liquid to quickly pass to the operating face of the piston and secondly to allow all such released liquid to be by-passed through a non-return valve from the operating face of the piston to the low-pressure feed line passing from the hydraulic motor or motors to the pump.

Thus at the instant when a load greater than that predetermined is applied to the draft means of the vehicle to thus produce an overload pressure in the liquid lines to the propelling motor or motors the liquid circulated by the pump is caused to by-pass the said motor or motors to thus effect the stoppage of the vehicle, this by-pass condition being maintained until liquid flow is caused to cease which result is obtained by moving the pump control to neutral so as to allow the combined valves, large and small, in the overload-release valve unit to close without subsequently causing or tending to cause propulsion of the vehicle, thereby preventing repetition of any overload from the same cause.

In a normal vehicle where such overloads can only apply when the vehicle is travelling in a forward direction there would be no need for similar overload-release means to be provided when reverse direction of travel of the vehicle is in operation but certain vehicles for agricultural and industrial application could with advantage be provided with such overload-release means in both directions of travel. This invention therefore allows for the inclusion when necessary of duplication of porting to obtain the desired effect whichever feed line from the pump to the hydraulic propelling motor or motors is providing liquid to effect propulsion of the vehicle and a change-over valve would then be provided to ensure that the overload-release valve is connected to the appropriate high-pressure feed line according to the direction in which the vehicle is travelling.

Preferably the operable means by which the overload, release valve spring is compressed is in the form of a cam provided with a series of shallow rounded notches around the edge or face contacting with the member through which the spring is compressed to act as a series of detents to enable a suitable predetermined setting to be retained.

A practical embodiment of this invention is now described with reference to the accompanying drawings.

Figure 3 is partly an external view of the valve unit viewed in direction C (Figure 1) and partly a section of the valve unit on line D—D (Figure 1).

Figure 4 is an external view of the valve unit viewed in direction E (Figure 1).

Figure 5 is a circuit diagram showing the interposition of the overload-release valve unit in the feed lines from the pump to (in this instance for illustration purposes) a pair of hydraulic propelling motors in an hydraulic transmission means of the type referred to.

Figure 1:
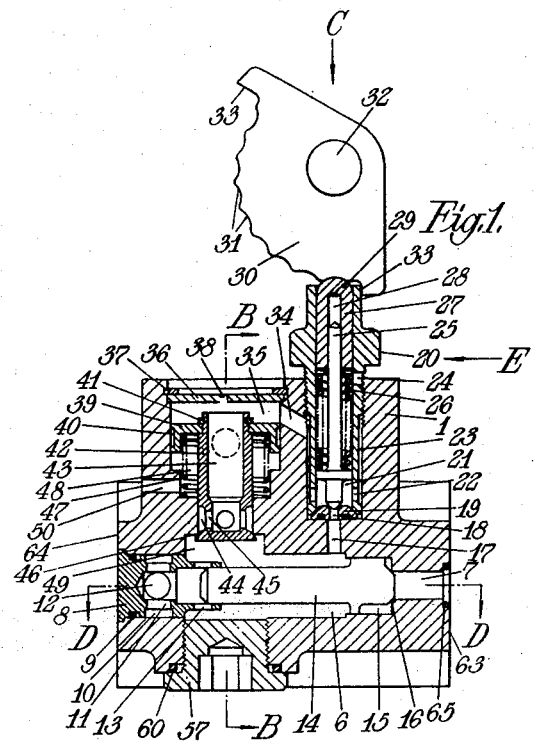
Figure 1 is a section through an overload-release valve unit on line A—A (Figure 2).

Referring to Figures 1–5 inclusive a valve unit body 1 is provided with through-bores 2—3 from which ports or passages 4—5 connect respectively, with the opposite ends of a change-over valve chamber 6, one end of which is reduced to form a passage 7 whilst the opposite end houses a valve sleeve 8 provided with an annular groove, in which is located a conventional compressible seal-ring 9, and another annular groove 10. Cross ports 11 connect the annular groove 10 with the bore 12 of the valve sleeve 8 said bore 12 being enlarged at one end to receive and serve as a support for one end of the change-over valve member 14 and to incorporate ports 13 connecting the bore 12 with the change-over valve chamber 6. The change-over valve member 14 is in the form of a reciprocating spool one end of which is enlarged closely to fit the bore of the said valve chamber 6 and to accommodate one or more blind-ended slots 15. A conical valve facing 16 is formed on the end of this valve member 14 for engagement with the inner end of passage 7 at its junction with the valve chamber 6 thus to form a valve seating.

Figure 5:
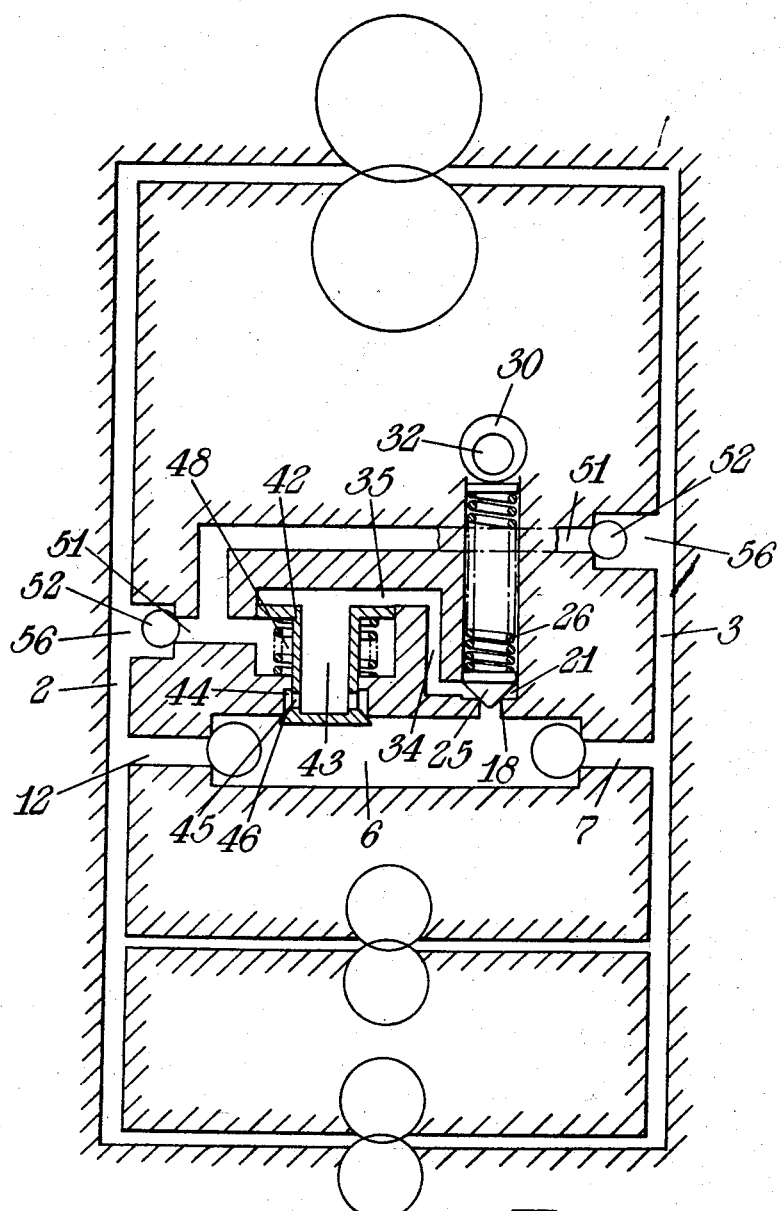

Referring to Figures 1 and 5 passage 17 connects the change-over valve chamber 6 with the bore 18 of the valve seating 19 which is retained by a valve sleeve 20 screwed into the overload release valve chamber in the valve body 1. The valve sleeve 20 is provided with a bore 21 and crossports 22 connecting the bore 21 with a wide annular groove 23, a relief hole 24 and also houses a poppet-type valve 25 loaded by a compression spring 26 abutting on the end face of an operable sliding round-ended plunger 27 the bore 28 of which is provided with a small relief hole 29 and also forms a support for an extension of the poppet valve 25. Located adjacent and in contact with the rounded end of the plunger 27 is an operable cam-plate 30 the edge or contacting face of which is provided with a number of rounded notches 31 each of which forms a detent for engagement with the plunger 27. The cam-plate 30 is fixed to a shaft 32 and is provided with extensions 33 one at each end of the notched face to act as stops by contact with alternate outer surfaces of the valve sleeve 20.

Figure 2:
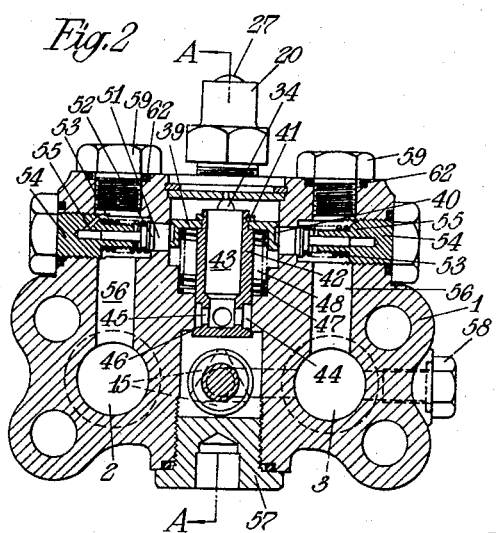
Figure 2 is a section through the valve unit on line B—B (Figure 1).

Referring to Figures 1, 2 and 5 a passage 34 connects the overload-release valve chamber to one end 35 of a supplementary valve chamber 48 which is closed at that end by a plate 36 retained by a conventional split retaining ring 37 a small relief hole 38 being provided in the plate 36. The valve chamber 48 houses a piston 39 provided with an annular groove 40 and a conventional split ring 41 retains the piston on one end of a valve sleeve 42 which incorporates a bore 43, an annular groove 44, cross-ports 45 and a conical valve facing 46.

A portion of the valve chamber 48 is reduced to a smaller bore to serve as a guide for the valve sleeve 42 and to provide a seat upon which the valve facing 46 is loaded by a compression spring 47 the said seat being located at the junction of this smaller bore with another and larger chamber 49 connecting with the change-over valve chamber 6. The outside of the valve sleeve 42 closely fits, but is free to slide within, the said smaller bore of the valve chamber 48 and the annular groove 44 is so positioned that it is at all times within the longitudinal confines of this smaller bore thus to allow the valve sleeve 42 to prevent liquid freely to pass to the valve chamber 48 on the inoperative side of piston 39. A relief passage 50 is provided in the valve chamber 48 on the inoperative side of the piston 39.

Referring to Figures 2 and 5 transfer passages 51 connect with the valve chamber 48 so that one edge of each transfer passage 51 is approximately in line with the edge of the annular groove 40 in the piston 39. Each transfer passage 51 is enlarged towards its outer end to provide a seating for a poppet valve 52 loaded by a spring 53 and supported by the blind ended bore of a sealing plug 54, a relief hole 55 connecting the blind end of the said bore to the enlarged portion of the said transfer passage 51. The transfer passages 51 are connected with the through-bores 2—3 by other transfer passages 56.

Referring to Figures 1, 3 and 4 in the manufacture of the valve unit body 1 the provision of the several ports or passages causes these to be otherwise unnecessarily open to the outside of the valve unit body 1 and plugs 57, 58, 59 are therefore provided together with conventional compressible seal rings 60, 61, 62 to seal the said open ends of these ports or passages.

Also it is convenient to provide the valve unit body 1 with faces 63, 64 to which can be attached the necessary conduits of the feed lines to and from the pump and hydraulic propelling motors, the necessary sealing against liquid leakage under pressure being provided by conventional, compressible, seal rings 65, 66, 67 in suitable recesses. Through-holes 68 are provided in the valve unit body 1 to facilitate the attachment of the said conduits.

Having described a practical construction of one embodiment of this invention we now describe the action of the overload release valve unit, for example in conjunction with a pair of hydraulic propelling motors.

The predetermined setting of the cam-plate 30 by the operator causes the compression spring 26 to load the poppet valve 25 on the valve seating 19 so that the most suitable pressure of liquid can be attained to provide a maximum-desirable draft force for the particular machine concerned.

In a vehicle of the type referred to high pressure liquid is passed by the pump through a conduit to one of the through-bores, for example 2, and thence to the hydraulic propelling motors to effect propulsion of the vehicle, liquid under low pressure being passed by the said motors back to the pump by way of the other throughbore 3. Thus the high-pressure liquid is enabled to reach passage 17 by way of the passage 5, annular groove 10, cross-ports 11, bore 12, ports 13, and the change-over valve chamber 6 and to be limited in pressure to the maximum allowed by the setting of the overload-release valve.

When the maximum desirable draft force is exceeded due to the machine concerned meeting an increased resistance whether by change in soil structure or a restrictive object such as a tree root or sunken boulder the pressure of liquid used for propulsion purposes is momentarily raised thus causing the poppet valve 25 to be lifted off its seating on the valve seat 19 thus, to allow a small stream of liquid under pressure to pass through the bore 18 in the valve seat 19 into the bore 21 of the valve sleeve 20 thence through the crossports 22 into the annular groove 23 and so by the interconnecting passage 34 to the operating end 35 of the valve chamber 48 thereby loading the piston 39.

Due to the said piston 39 being larger in area than the end of the valve sleeve 42 the load on the piston 39 causes the valve seat 46 to be lifted so to allow a greater quantity of liquid under pressure to be passed to the operating end 35 of the valve chamber 48 by way of the annular groove 44, the crossports 45 and the bore 43 of the valve sleeve 42. Movement of the piston 39 to effect the lifting of the valve seat 46 causes the piston 39 to slide across and uncover the transfer passage 51 to allow the liquid to be pumped to the non-return valves 52 one of which connecting to the low-pressure flow line is thereby caused to be lifted so that the liquid can then pass to the other throughbore 3 from whence it passes back to the pump so causing the supply of liquid to by-pass the propelling motors and thus prevent the travel of the vehicle and the loading of the draft means between the vehicle and any machine attached to or drawn by the vehicle.

Flow of liquid through the valve unit prevents the poppet valve 25 and the valve seat 46 from returning to their respective seatings and the vehicle therefore remains stationary without imposing any load on the machine or draft means and cannot be caused to be propelled until flow through the valve unit ceases a condition which can only be obtained by moving the pump control to its neutral or inoperative position.

When the vehicle is travelling in the reverse direction from that in which the aforesaid action takes place the previous high- and low-pressure liquid-flow lines become the low- and high-pressure, liquid-flow lines respectively and the through-bore 3 is then subjected to high pressure which, being imposed on the conical end of the change-over valve member 14 by way of passages 4 and 7, moves the said member 14 to the opposite end of the change-over valve chamber 6 thereby closing ports 13 and at the same time allowing the slots 15 at the end of the said member 14 to enter the said valve chamber 6 so as to connect this chamber hydraulically with the through-bore 3. Thus when travelling in a reverse direction a control of maximum desirable draft force is able to be obtained in a manner similar to that already described for the conditions when travelling in the opposite direction.

The embodiment described has the advantage of providing that when the control is set for the maximum draft force any excess force will automatically cause the overload-release valve to operate and thus act as a maximum-pressure safety valve for whichever liquid-flow line is subjected to high pressure for propulsion purposes.

The overload-release valve unit so far described relates to the type which is used in vehicles of the type referred to wherein it is desirable to control the maximum desirable draft force for a particular machine in both forward and reverse directions of travel. In vehicles of the type referred to wherein such control is only desirable when working in a forward direction of travel a simplified overload-release valve unit could be used if desired wherein the change-over valve chamber and member would not be required and the through-bore to which the pressurised liquid for propulsion purposes is passed would then only and freely be connected with the overload-release valve and the other through-bore would only be connected to the valve chamber 48 by way of a non-return poppet valve 52. A separate, maximum-pressure, release valve would however need to be incorporated in the circuit to ensure that when the vehicle is travelling in the reverse direction the pressure of liquid to derive propulsion of the vehicle in that direction is limited for safety purposes.

We claim:

1. Relief valve means for self-propelled vehicles of the kind in which a conventional power unit drives a pump supplying high-pressure liquid to one or more hydraulic propelling motors and receiving exhaust liquid back from the motors comprising pressure and exhaust liquid connections, a main fluid chamber adapted to be supplied with liquid from the pressure liquid connection, a poppet-type valve and valve spring normally closing the main fluid chamber, operator controlled adjustable means for varying the pressure of the valve spring at will and hence the pressure at which the valve opens the main fluid chamber, a supplementary fluid chamber, a passage connecting the main fluid chamber to the supplementary fluid chamber when the poppet-type valve is in the open position, a combined piston and supplementary spring-loaded valve, of larger capacity than the poppet-type valve, the piston operating in the supplementary chamber, and the supplementary valve normally closing the main chamber, the piston area being larger than the area of the supplementary valve by an amount which when subject to the high pressure liquid is sufficient to open and maintain open the supplementary valve against its spring loading, a passage through the combined piston and supplementary valve connecting the main chamber and the supplementary chamber when the supplementary valve is in the open position, a further passage connecting the supplementary chamber to the exhaust fluid connection when the supplementary valve is in the open position and a one-way valve in said further passage.

2. Relief valve as claimed in claim 1, in which said means for varying the pressure of the valve spring comprises a plunger acting on the spring and a manually operable notched cam plate engaging with the end of the plunger.

3. Relief valve means for self-propelled vehicles of the kind in which a conventional power unit drives a pump supplying high-pressure liquid to one or more hydraulic propelling motors and receiving exhaust liquid back from the motors comprising two liquid connections, a main fluid chamber, means for connecting the main fluid chamber to whichever of the two fluid connections receives the pressure fluid, a valve and valve spring normally closing the main fluid chamber, operator controlled adjustable means for varying at will the pressure of the valve spring and hence the pressure at which the valve opens the main fluid chamber, a supplementary fluid chamber, a passage connecting the main fluid chamber to the supplementary fluid chamber when the variable pressure valve is open, a combined piston and supplementary spring-loaded valve of larger capacity than the variable pressure valve the piston operating in the supplementary chamber and the supplementary valve normally closing the main fluid chamber, the piston area being larger than the area of the supplementary valve by an amount which when subject to the high pressure liquid is sufficient to open and maintain open the supplementary valve against the spring loading, a passage through the combined piston and valve connecting the main fluid chamber and the supplementary chamber when the supplementary valve is in the open position, two further passages respectively connecting the supplementary chamber to the two liquid connections and one-way valves in each, said further passages being arranged so as to be uncovered when the supplementary valve is opened.

4. Relief valve means as claimed in claim 3 in which said means for connecting the main fluid chamber to whichever of the fluid connections receives the pressure liquid is a change-over valve.

References Cited in the file of this patent

UNITED STATES PATENTS

| | | |
|---|---|---|
| 2,122,045 | Rose et al. | June 28, 1938 |
| 2,284,615 | Kligman | May 26, 1942 |
| 2,474,772 | Ashton | June 28, 1949 |
| 2,541,291 | Robinson | Feb. 13, 1951 |
| 2,574,416 | Rose | Nov. 6, 1951 |
| 2,614,580 | Cormier | Oct. 21, 1952 |